United States Patent [19]

Mitsui

[11] 4,160,182
[45] Jul. 3, 1979

[54] LAMINATED CORE MANUFACTURE

[75] Inventor: Yoshiaki Mitsui, Kitakyushu, Japan

[73] Assignee: Mitsui Mfg. Co., Ltd., Kitakyushu, Japan

[21] Appl. No.: 819,478

[22] Filed: Jul. 27, 1977

[51] Int. Cl.² .............................................. H02K 3/48
[52] U.S. Cl. .................................... 310/214; 310/216; 310/42; 310/217
[58] Field of Search ............... 310/214, 215, 216, 217, 310/254, 258, 421

[56] References Cited
U.S. PATENT DOCUMENTS

| | | | |
|---|---|---|---|
| 1,396,521 | 11/1921 | Myers | 310/214 UX |
| 1,839,299 | 1/1932 | Cornu | 310/214 X |
| 2,303,291 | 11/1942 | Moss | 310/219 UX |
| 2,838,703 | 6/1950 | Balke | 310/217 |
| 2,975,312 | 3/1961 | Ploran | 310/217 |
| 3,035,195 | 5/1962 | Jaun et al. | 310/214 |
| 3,202,851 | 8/1965 | Zimmerle et al. | 310/217 X |
| 3,840,983 | 10/1974 | Ryff | 310/217 X |
| 3,845,340 | 10/1974 | Brooks et al. | 310/217 |

FOREIGN PATENT DOCUMENTS 147913 9/1931 Switzerland .............................. 310/214

Primary Examiner—Donovan F. Duggan
Attorney, Agent, or Firm—Wegner, Stellman, McCord, Wiles & Wood

[57] ABSTRACT

A dynamoelectric device having a wound core provided with a plurality of circumferentially spaced, radially opening slots disposed in an annular array. Windings are provided in the slots and an annular slot closure formed of magnetic material having a plurality of through openings is disposed coaxially of the annular array of slots with the through openings being disposed centrally of the open end of the slots. The slot closure is formed of magnetic material and is defined by a stacked assembly of interlocked, coaxial annular laminations. The interlocking structure may include a pair of apposed fingers at opposite sides of the through opening. The fingers may be offset from the lamination to define a recess with the fingers of one lamination being disposed in interlocking fitted association with the recess of the adjacent lamination in the stacked core assembly. The openings and interlocking fingers may be stamped from the lamination.

23 Claims, 10 Drawing Figures

LAMINATED CORE MANUFACTURE

BACKGROUND OF THE INVENTION

1. Field of the Invention

This invention relates to dynamoelectric devices and in particular to the manufacture of laminated core structures for use in such devices.

2. Description of the Prior Art

In U.S. Pat. No. 3,202,851 of W. J. Zimmerle et al, a manufacture of a dynamoelectric machine is illustrated wherein interlocked laminations are provided for forming a stator assembly. The laminations are provided with formed projections to define the desired interlocking means between the respective laminations.

Additional prior art U.S. patents which show the state of the art in connection with apparatus and processes for forming such stacked laminated structures include Phelps et al No. 1,817,462, Johnson No. 1,861,059, Zimmerle No. 3,210,824, Bausman et al No. 1,874,158 Heftler No. 2,283,629, Goran No. 2,368,295, Roters No. 2,483,204, Korski No. 2,763,916, Ebbert No. 2,933,204, Westphalen No. 2,971,106, Ploran No. 2,975,312, Hicks No. 2,996,791, Rediger No. 3,012,162, Hopp et al No. 3,060,992, Post No. 3,062,262, Boyer No. 3,070,058, Zimmerle No. 3,110,831, Zimmerle No. 3,203,077, and MacLaren No. 2,998,638. Additionally, Canadian Pat. No. 603,175 of Gordon W. Herzog, and German Pat. No. 917,626 teach interlocked laminated sheet structures for such structures.

SUMMARY OF THE INVENTION

The present invention comprehends an improved dynamoelectric device having a wound core provided with a plurality of circumferentially spaced, radially opening slots disposed in an annular array with windings being provided in the slots. An improved annular slot closure is provided coaxially of the annular array. The slot closure is formed of magnetic material and having a plurality of through openings disposed one each centrally of the open end of the slots.

The slot closure may comprise a stacked assembly of interlocked coaxial annular laminations. In the illustrated embodiment, the long core is formed as a stacked assembly of interlocked coaxial annular laminations.

The openings extend parallel to the axis of the slot array.

The interlocking means may comprise apposed fingers defining the through openings. In the illustrated embodiment, the openings are circular.

The openings may have an extent circumferentially of the annular closures substantially less than the corresponding circumferential extent of the slot open end and may have a transverse extent perpendicular to the direction of the extent of the fingers substantially greater than the width of the fingers.

The fingers are offset from the lamination to define a recess so that the fingers of one lamination are disposed in interlocking fitted association with the recess of the adjacent lamination in the stacked core assembly.

In the illustrated embodiment, the fingers include a connecting portion extending at an angle to the transverse extent of the lamination and a distal end portion extending substantially parallel to the transverse extent of the lamination.

In the illustrated embodiment, the end portion of the fingers is displaced from the lamination substantially the thickness thereof whereby the recess has a depth substantially equal to the thickness of the lamination.

The distal ends of the fingers may be concave and in the illustrated embodiment, are rounded.

In the illustrated embodiment, the fingers are defined by arcuate side edges extending generally parallel to the arcuate side edges of the annular slot closure.

The structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
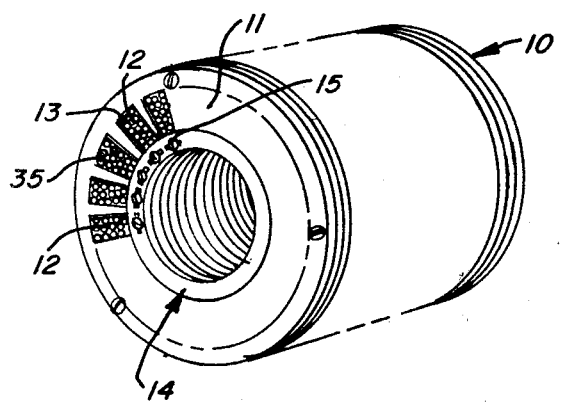
FIG. 1 is an isometric view of a dynamoelectric device embodying the invention.

In the exemplary embodiment of the invention as disclosed in the drawing, a dynamoelectric device generally designated 10 is shown to include a core 11 provided with a winding 12 disposed in a plurality of radially opening slots 13 disposed in an annular array. In the illustrated embodiment, the slots open radially inwardly, it being understood that the invention comprehends the provision of such a dynamoelectric device wherein the slots may open reversely outwardly.

The invention comprehends the provision of an improved slot closure for closing the open end of the slots and in the illustrated embodiment, the slot closure 14 comprises an annular closure coaxially within the core 11.

The slot closure is provided with a plurality of through openings 15 which are aligned one each centrally of the open ends 16 of the slot 13.

Figure 2:
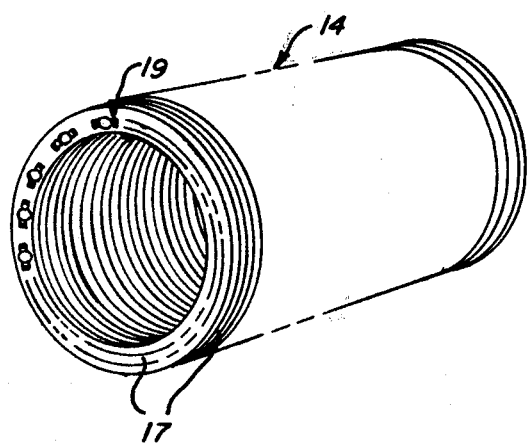
FIG. 2 is an isometric view of the annular slot closure thereof.

The invention comprehends that the slot closure be formed of a stacked assembly of interlocked coaxial annular laminations 17 which may be stamped from a strip 18 of suitable magnetic material, such as silicon steel. As shown in FIG. 2, the laminations 17 of the slot closure 14 may be interlocked in coaxial stacked association by suitable interlock means generally designated 19 prior to the installation thereof within the core 11.

Figure 4:
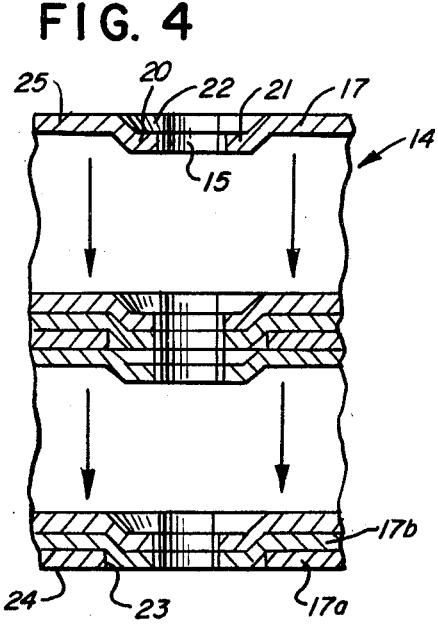
FIG. 4 is a vertical section illustrating the interlocking assembly of the laminations to form the stacked core assembly.

The interlock means of the present invention is more specifically illustrated in FIGS. 4-8. As shown therein, the laminations 17 may be provided with a pair of apposed interlocking fingers 20 and 21 at opposite sides of the opening 15. The fingers are offset from the lamination 17 to define a recess 22. As shown in FIG. 4, the fingers of a superjacent lamination are thusly received in the recess of the subjacent lamination in the stacked assembly 14 so as to provide positive interlocked association between the laminations. The invention comprehends that the laminations be stamped to define the respective holes 15 and fingers 20 and 21 and blanked out from the strip 18 with the successive blanked out laminations being concurrently stacked to form the assembly 14. The first lamination of the stack, identified as lamination 17a in FIG. 4, has the fingers 20 and 21 blanked out to define an enlarged opening 23 so that the fingers of the superjacent lamination 17b may be received in the opening 23. As no portion of the lowermost lamination 17a is offset downwardly therefrom, the bottom surface 24 thereof is effectively planar so as to define a flat end portion of the stacked assembly 14. As further seen in FIG. 4, the upper surface 25 of the uppermost lamination 17 has no upwardly extending projections thereon so that the upper end of the stacked assembly is similarly effectively flat.

Referring now more specifically to FIGS. 5-8, fingers 20 and 21 may be seen to comprise offset fingers having a connecting portion 26 and a distal end portion 27. The connecting portion is angled from the transverse extent of the laminations 17 and in the illustrated embodiment, extends at an angle of approximately 45° thereto. The end portion 27 is substantially parallel to the flatwise extent of the laminations 17 and in the illustrated embodiment, is offset therefrom substantially the thickness of the lamination whereby the depth of the recess 22 is effectively equal to the thickness of the lamination.

As will be obvious to those skilled in the art, the connecting portions 26 may be elongated so as to displace the end portions 27 at any desired distance from the lower surface 28 of the lamination. Where the end portions 27 are spaced below the laminations surface 28, as will be obvious to those skilled in the art, the end portions 27 will be received in the next subjacent lamination recess to at least a partial extent. Where such construction is utilized, a pair of lowermost laminations 17a may be provided so as to accommodate the greater downward extent of the lowermost set of fingers. As will be obvious to those skilled in the art, similar further extension of the fingers may be provided by utilizing a suitable number of lowermost laminations 17a to accommodate the extension of the lowermost set of fingers.

Figure 5:
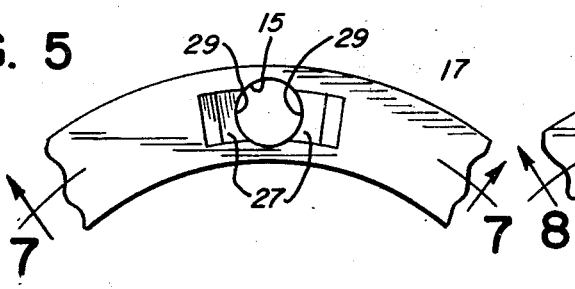
FIG. 5 is a fragmentary plan view of a portion of the annular slot closure.
Figure 6:
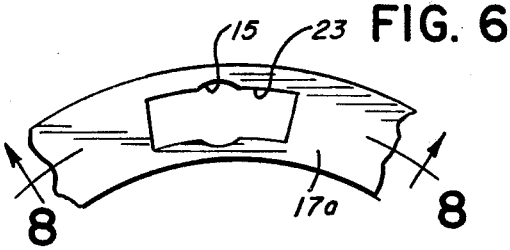
FIG. 6 is a fragmentary plan view of the corresponding portion of the end lamination of the stacked assembly wherein the interlocking fingers are blanked out.
Figure 7:
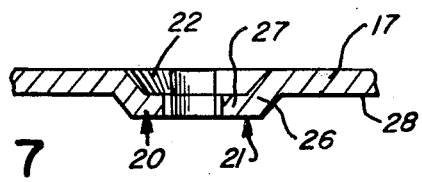
FIG. 7 is a vertical section taken substantially along the line 7—7 of FIG. 5.
Figure 8:
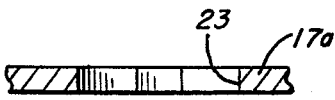
FIG. 8 is a vertical section taken substantially along the line 8—8 of FIG. 6.

As shown in FIGS. 5 and 6, the holes 15 in the illustrated embodiment comprise circular holes. As will be obvious to those skilled in the art, the hole configuration may be as desired and illustratively may comprise oval holes. As shown in FIG. 5, the distal edge 29 of the finger end portions 27 may define a substantial portion of the opening 15 and, thus, in the embodiment of FIGS. 5 and 7, the distal edge 29 is circular.

Figure 3:
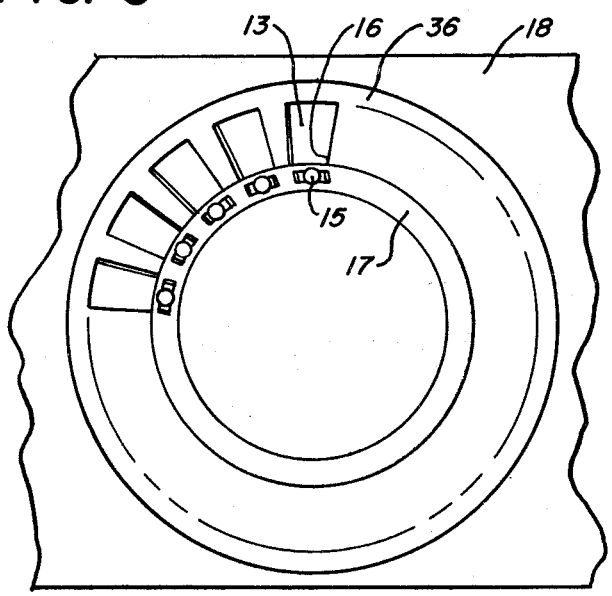
FIG. 3 is a plan view of a sheet metal strip from which the laminations of the core are stamped.

As further shown in FIG. 5, the diameter of the opening 15 may be substantially larger than the width of the fingers 27. As shown in FIG. 3, the diameter of the openings 15 may be substantially less than the circumferential extent of the open end 16 of the slots 13.

Figure 9:
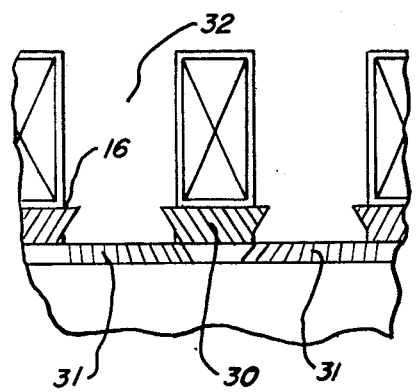
FIG. 9 is a diagrammatic section illustrating the flux distribution in the conventional long core construction.
Figure 10:
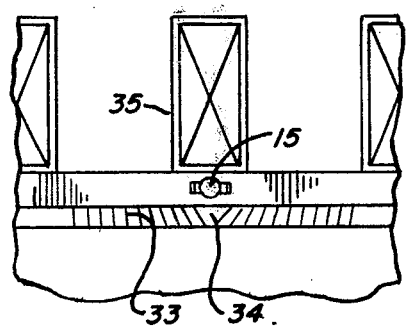
FIG. 10 is a diagrammatic section illustrating the flux distribution in the core structure of the present invention.

As shown in FIG. 1, the function of the slot closure is to overlie the open end of the slots 13 and retain the windings 12 therein. By virtue of the improved construction of the slot closure wherein only a small opening 15 is provided in the magnetic core material, an improved flux distribution is obtained in the dynamoelectric device. This improved functioning is illustrated in FIGS. 9 and 10. Thus, in FIG. 9, the prior art construction, which utilizes conventional magnetic wedges 30, causes the magnetic flux 31 to fluctuate substantially along the annular array of the windings. More specifically, the flux density is greater in the area inwardly of the teeth 32 between the slots and substantially less in the area inwardly of the slots closed by the wedges 30. In the improved construction of the present invention, the flux 33 is caused to have a substantially improved uniform distribution along the annular extent of the slot closure with only a small portion 34 having significantly less flux density as a result of the relatively small size of the openings 15. Thus, an improved operation of the dynamoelectric device is obtained by a reduction in iron losses and noise.

Still further, the present invention facilitates the construction of the dynamoelectric device by permitting the assembly of the slot closure means by a single introduction of the slot closure structure 14 into the previously wound core 11 to form the device 10, as shown in FIG. 1.

By permitting the slots to be radially open prior to the installation of the slot closure in association therewith, facilitated manufacture of the wound core is obtained. Thus, the insulating means 35 may be readily installed in the slots through the radially open end thereof and the provision of the winding 12 is greatly facilitated.

Further, the present invention provides an improved low cost method of manufacture in permitting both the slot closure lamination 17 and the core laminations 36 to be formed by concurrent stamping operations so that an accurate fit of the slot closure with the core lamination 36 is automatically provided. Further, by thusly forming the core and slot closure laminations, waste material is reduced effectively to a minimum further lowering the cost of the device 10.

The device 10 may define an improved wound core device by virtue of the facilitated winding as the winding can be mechanized automatically with great facility, and resultingly, the winding may have a substantially improved higher density within the slots. Alternatively, the slots may be made smaller in view of the compacted winding capabilities provided by the disclosed construction.

As indicated above, the stamping operation may be effected concurrently with the stacking operation so as to further reduce the cost of manufacture of the device 10. The core laminations 36 may be provided with suitable interlocking means stamped therein during the stamping operations on strip 18 and, thus, the core laminations may be stacked in interlocked association in a manner similar to the stacked interlocked association of the laminations of the slot closure 14.

In the illustrated embodiment, the holes 15 are illustrated as being open. If desired, the holes may be filled with suitable material, such as insulating plastic or adhesive, as desired.

While in the illustrated embodiment interlocking fingers are provided in association with each of the openings 15, as will be obvious to those skilled in the art, a different number of interlocking fingers may be provided as desired. Thus, if desired, the interlocking means may be provided in association with only selected ones of the openings 15.

The foregoing disclosure of specific embodiments is illustrative of the broad inventive concepts comprehended by the invention.

I claim:

1. In a dynamoelectric device having a wound core provided with a plurality of circumferentially spaced, radially opening slots disposed in an annular array, and windings in said slots, the improvement comprising
an annular slot closure coaxial of said annular array, said slot closure being formed of magnetic material and having a plurality of through openings disposed one each centrally of the open end of said slots and having an extent transversely to the slots substantially less than the width of the slots.

2. The dynamoelectric device of claim 1 wherein said slot closure comprises a stacked assembly of interlocked coaxial annular laminations.

3. The dynamoelectric device of claim 1 wherein said wound core comprises a stacked assembly of interlocked coaxial annular laminations.

4. The dynamoelectric device of claim 1 wherein said through openings extend parallel to the axis of the slot array.

5. The dynamoelectric device of claim 1 wherein said slot closure comprises a stacked assembly of coaxial annular laminations having cooperating interlocking means, said interlocking means further defining said through openings.

6. The dynamoelectric device of claim 1 wherein said through openings are circular.

7. The dynamoelectric device of claim 1 wherein said through openings are circular and have a diameter substantially less than the corresponding circumferential transverse extent of the slot open end.

8. The dynamoelectric device of claim 1 wherein said through openings have a radial extent substantially less than the radial extent of said annular slot closure.

9. The dynamoelectric device of claim 1 wherein said slot closure comprises a stacked assembly of coaxial annular laminations having a pair of interlocking means disposed one each at opposite sides of said through opening.

10. The dynamoelectric device of claim 1 wherein said slot closure comprises a stacked assembly of coaxial annular laminations having a pair of interlocking projections disposed one each at opposite sides of said through opening.

11. The dynamoelectric device of claim 1 wherein said through openings are provided with an insulating filler.

12. In a dynamoelectric core assembly having a plurality of stacked laminations, improved means for interlocking said laminations comprising:
a through opening in each of the laminations; and
a pair of apposed fingers at opposite sides of the opening, said fingers being cantilevered from the laminations to define a recess, the fingers of the laminations being offset from the laminations to be disposed in interlocking fitted association with the recess of the adjacent laminations in the stacked core assembly and with the openings in the adjacent laminations in overlying relationship.

13. The dynamoelectric core assembly of claim 12 wherein said fingers are mirror image similar.

14. The dynamoelectric core assembly of claim 12 wherein the distal end of said fingers define said through opening.

15. The dynamoelectric core assembly of claim 12 wherein said fingers include a connecting portion extending at an angle to the transverse extent of the laminations, and a distal end portion extending substantially parallel to said transverse extent of the laminations.

16. The dynamoelectric core assembly of claim 12 wherein said fingers include a connecting portion extending at an angle to the transverse extent of the laminations, and a distal end portion extending substantially parallel to said transverse extent of the laminations, said end portion being displaced from the laminations substantially the thickness of the lamination whereby the recess has a depth substantially equal to the thickness of the lamination.

17. The dynamoelectric core assembly of claim 12 wherein the distal ends of said fingers are concave.

18. The dynamoelectric core assembly of claim 12 wherein the distal ends of said fingers are rounded.

19. The dynamoelectric core assembly of claim 12 wherein said opening has a transverse extent perpendicular to the direction of extent of said fingers substantially greater than the width of the fingers.

20. The dynamoelectric core assembly of claim 12 wherein said opening is circular and has a diameter perpendicular to the direction of extent of said fingers substantially greater than the width of the fingers.

21. The dynamoelectric core assembly of claim 12 wherein said fingers and opening comprise a stamped portion of the lamination.

22. The dynamoelectric core assembly of claim 12 wherein said laminations are annular.

23. The dynamoelectric core assembly of claim 12 wherein said fingers are defined by arcuate side edges.

* * * * *